3,468,914
4-PYRONE SYNTHESIS

Alfred A. Schleppnik, St. Louis, and Marvin L. Oftedahl, Crestwood, Mo., assignors to Monsanto Company, St. Louis, Mo., a corporation of Delaware
No Drawing. Filed May 16, 1966, Ser. No. 550,158
Int. Cl. C07d *7/16, 7/14*
U.S. Cl. 260—345.9                                  2 Claims

ABSTRACT OF THE DISCLOSURE

Process for the preparation of 2-alkyl-3-hydroxy-4-pyrones by the reaction sequence (1) β-unsaturated ketone with an oxalic acid diester; (2) cyclization of the adduct in acid medium; (3) oxidation of the cyclized product to yield a 3-hydroxy pyrone; and (4) decarboxylation.

These compounds have utility as food enhancers.

---

The present invention relates to the preparation of gamma-pyrones, some of which are new, and particularly provides a new totally synthetic four-step process for preparing maltol and 2-alkyl homologs of maltol and related compounds.

Maltol, 2-methyl-3-hydroxy-4-pyrone, is well known for its usefulness as a flavor enhancer in food products such as pastries, and various beverages such as coffee. It is also used as a fragrance enhancer in perfumes and essences. Its 2-alkyl homologs such as ethylmaltol [2-ethyl-3-hydroxy-4-pyrone], propylmaltol, and butylmaltol have similar flavor enhancing properties and may be used in place of maltol in various applications.

An object of this invention is to provide a process for preparing maltol and related homologs by a total synthetic chemical route which does not rely on fermentation media or destructive distillation methods to obtain pyrone starting materials.

A more specific object is to provide a synthetic process for preparing maltol in a relatively short four-step process starting with commercially available 3-penten-2-one and oxalic acid diesters such as diethyl oxalate.

Another object of this invention is to provide new and useful 2-alkyl-2,3-dihydro-6-carbo(ester)4-pyrones such as 2-methyl-2,3-dihydro-6-carbomethoxy-4-pyrone, and 2-methyl-2,3-dihydro - 6 - carboethoxy-4-pyrone, and the free acids from such esters which compounds are useful as intermediates in the preparation of flavor enhancers such as maltol.

These and other objects, aspects, and advantages of this invention will become apparent from reading the description and claims which follow hereinbelow.

Briefly, this invention satisfies the above objects and provides a process for preparing 2-alkyl-3-hydroxy-4-pyrones such as maltol, and related homologs by a totally synthetic 4-step chemical process from commercially available chemicals. Along the way to the desired maltol-type desired final products, this invention also provides methods for preparing some new and useful intermediates. The following sequence of reactions to be detailed hereinafter illustrates the new method of making maltol, and the new intermediate chemicals

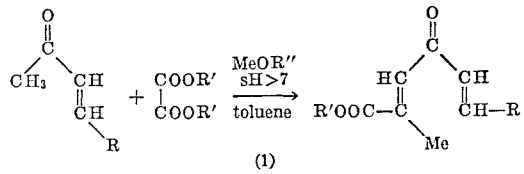

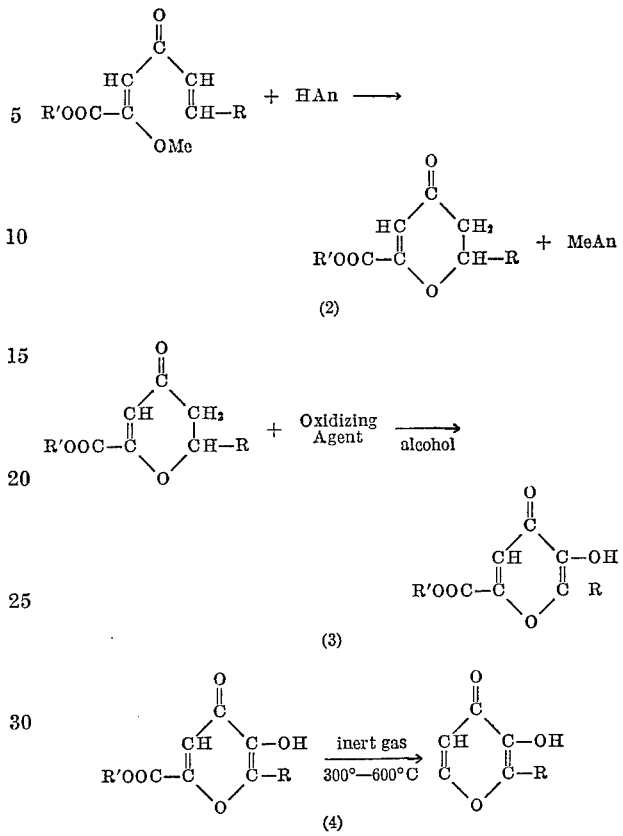

where R is an alkyl group having from 1 to 4 carbon atoms, each R' is either alkyl having from 1 to 4 carbon atoms phenyl, or tolyl and R" is the residue of a basic lower alkoxide having from 1 to 6 carbon atom catalyst, such as sodium methoxide or potassium hexoxide. Preferably both R' groups are the same, and are alkyl having from 1 to 4 carbon atoms.

A specific embodiment of the above generalized process is to (1) react 3-penten-2-one with diethyl oxalate in a basic medium provided; e.g., by an alkali metal alcoholate such as sodium methoxide in a hydrocarbon diluent such as toluene at a temperature of from about $-10°$ C. to about $50°$ C. to form an alkali metal enolate of the 3-penten-2-one diethyl oxalate adduct, (2) treat the adduct from step 1 with sufficient strong acid such as anhydrous alcoholic hydrochloric acid to convert the adduct to 2-methyl - 2,3 - dihydro-6-carboethoxy-4-pyrone, (3) oxidize the 2-methyl-2,3-dihydro-6-carboethoxy-4-pyrone under conditions to introduce a double bond in the pyrone ring betwen the carbon atoms in the 2 and 3 positions, and to introduce a hydroxyl group on the carbon atom in the 3 position of the ring such as by reacting with selenium dioxide in an alcoholic medium until 2-methyl-3-hydroxy - 6 - carboethoxy-4-pyrone [6-carboethoxymaltol] is formed, and (4) pyrolyze or decompose the 2-methyl-3-hydroxy-6-carboethoxy-4-pyrone by heating it in an inert atmosphere at from about $450°$ C. to about $550°$ C. to form maltol as a product of the process.

The 3-alken-2-one compounds which are used as starting materials in the process of this invention are obtained by reacting a lower alkanone with a lower alkanecarboxaldehyde followed by dehydration of the resulting keto-alcohol. Useful alkanones include acetone, methyl ethyl ketone, diethyl ketone, ethyl propyl ketone, and dipropyl ketone. Suitable aldehydes include formaldehyde, acetaldehyde, propionaldehyde, n-butenaldehyde and isobutyraldehyde. For example, the use of 3-hexen-2-one from acetone and propionaldehyde lead to the formation of ethylmaltol [2-ethyl-3-hydroxy-4-pyrone] by the process of this invention. The ene-one cmpounds made from these chemicals can be prepared by crossed aldol condensation with acid catalyzed dehydration of the resulting keto-alcohols, according to conventional methods.

In step (1) of the process of this invention the 3-alken-2-one and the diester of oxalic acid are reacted in a substantially non-aqueous medium. The reactants may be mixed alone or as is preferred, certain protic or non-protic organic liquids can be used as a solvent or diluent for the reaction mixture. The protic or non-protic organic liquid used can have a boiling point below about 120° C. Protic solvents are compounds or mixtures which can generate a proton (H+) under the conditions of the reaction and include high alcohols such as tert-butanol, isopropanol, amyl alcohols, carboxylic acids, mercaptans, or those compounds which accept protons like amines. Lower alkanols such as methanol are not preferred because they add to some extent to the alken-one reactants thus diminishing the possible yield of product. Non-protic solvents or diluents are organic liquids which will not generate a proton nor accept a proton under the conditions of the reaction, e.g. hydrocarbons, chlorinated hydrocarbons, dialkyl ethers, dialkylacylamides such as dimethylformamide, and dialkylsulfoxides such as dimethylsulfoxide. The reaction is conducted in the presence of a strong base to maintain the pH of the mixture above about pH 7, preferably above pH 10.

The alken-one/oxalic acid ester adduct product of step one is treated in step (2) with a strong acid which does not oxidize the reaction mixture substantially, preferably a mineral acid such as hydrochloric acid, sulfuric acid, phosphoric acid, etc. to neutralize the adduct and to effect cyclization of the product to the 2-alkyl-2,3-dihydro-6-carbo(ester)-4-pyrone. The acid is used in an amount which is at least stoichiometrically equivalent to the base content of the initial reaction mixture. Preferably, enough acid is added to reduce the pH of the mixture to below about 2 to insure complete reaction. The acid may be added as a dry gas or dissolved in a suitable anhydrous alcohol such as a lower alkanol such as methanol, ethanol, or propanol.

The oxalic acid diester may be any ester which will react with a 3-alken-2-one to form an adduct convertible to a 2-alkyl-2,3-dihydro-6-carbo(ester)-4-pyrone ring upon treatment of the adduct with an acid. We prefer that the ester groups be either alkyl groups having from 1 to 4 carbon atoms, phenyl, or tolyl.

The temperature of the reaction mixture in step (1) should be kept below about 50° C. but in a liquid state, which is usually above about −10° C. Preferably the temperature is kept below 30° C. with cooling as needed. The base used is preferably a solvent-alkali metal complex such as alkali metal alkoxides, e.g. sodium methoxide, potassium ethoxide, lithium methoxide, potassium butoxide, or sodium tert-pentoxide, which bases can be made, e.g. by adding the metal to anhydrous alkanol such as methanol, ethanol, etc., or by adding anhydrous alkanol to the alkali metal hydride in benzene, or an alkali metal dispersion in benzene or toluene.

The 3-alken-2-one and the oxalic acid diester reactants in step (1) may be added separately or in admixture to the reaction vessel containing the base and any desired diluent. We prefer to add the oxalic acid to the sodium ethoxide suspended in a hydrocarbon diluent such as benzene or toluene and then add the 3-alkene-2-one to the complex formed between the oxalic acid diester and the sodium ethoxide.

In the step (1) reaction which is involved in the process of this invention primarily for the production of maltol and its 2-alkyl homologous products directly, some of the products are new compounds, which, of course, are useful for preparing maltol and related flavor enhancers by the process of this invention. Other compounds produced by this step (1) are new compounds which are not directly useful in this process for preparing maltol or related compound by this invention, but could be used to prepare maltol by more circuitous routes. For example, 2 - alkyl-2,3-dihydro-6-carbomethoxy-4-pyrones are produced by the process of this step (1) operation by reacting a 3-alken-2-one with dimethyl oxalate. However, the 6-carbomethoxy group containing compounds are very difficult to pyrolyze to remove the whole carbomethoxy groups in step (4) of this process. But such group can be removed by other methods to prepare maltol or related compounds. For example, by reacting 3-penten-2-one with dimethyl oxalate there is formed 2-methyl-2,3-dihydro-6-carbomethoxy-4-pyrone, a new compound. This new compound may be oxidized as in step (3) to form 2-methyl-3-hydroxy-6-carbomethoxy-4-pyrone, and then hydrolyzed with an acid or base to remove the ester group in the 6-position to form 2-methyl-3-hydroxy-6-carboxy-4-pyrone, which can be decarboxylated by known methods to obtain maltol. (See, e.g. U.S. Patent 3,159,652, issued Dec. 1, 1964; step 5). Alternatively the 2-methyl-2,3-dihydro-6-carbomethoxy-4-pyrone may be de-esterified first, preferably by treatment with an acid having an ionization constant at least as high as $10^{-4}$ such as hydrochloric acid to form 2-methyl-2,3-dihydro-6-carboxy-4-pyrone, another new compound, which can be treated to introduce a hydroxyl group in the 3-position and decarboxylated by known methods to make maltol.

When the reaction between the 3-alken-2-one and the oxalic acid diester has proceeded to the desired extent, the reaction mixture contains the precursor of the desired 2-alkyl-2,3-dihydro-6-carbo(ester)-4-pyrone. We call this precursor an alkyl 2,4-dioxy-5-alkenoate as its alkali metal or other basic enolate. Acidification of the reaction mixture with a strong acid, say, one having an ionization constant at least as high as $10^{-4}$, such as a strong mineral acid liberates the free unsaturated diketo-esters which cyclizes under aicd catalyses to form the desired 2-alkyl-2,3-dihydro-6-carbo(ester)-4-pyrone. Using 3-hexen-2-one and dipropyl oxalate as starting material examples and an alkalimetal alcoholate as the base the intermedite or step (1) product formed is an alkali-metal derivative of propyl 2,4-dioxy-5-octenoate (I) which cyclizes under acid catalysis to form 2-ethyl-2,3-dihydro-6-carboproxy-4-pyrone (II)

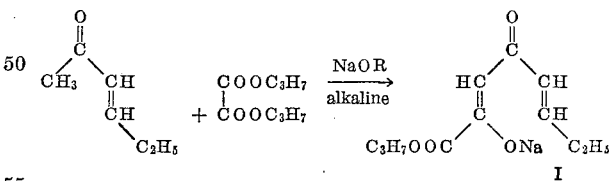

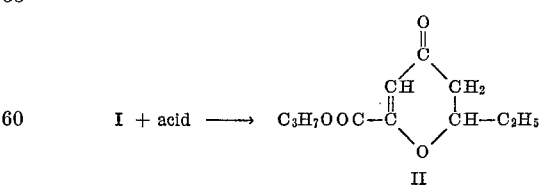

The 2-alkyl-2,3-dihydro-6-carbo(ester)-4-pyrone product of step (2) of the process is then treated according to step (3) of this process to oxidize the 2-alkyl-2,3-dihydro-6-carbo(ester)-4-pyrone to introduce a double bond between carbon atoms in the 2 and 3 positions of the pyrone ring and to introduce a hydroxyl group on the carbon atoms in the number 3 position of the pyrone ring. This oxidation may be accomplished by any of several suitable methods. Two such methods of oxidizing these involve (a) adding selenium dioxide to an alcoholic mixture of the 2-alkyl-2,3-dihydro-6-carbo(ester)-4-pyrone and warming the reaction mixture until the desired reaction has occurred, and (b) to effect the oxidation with an oxygen containing gas such as air using a cobalt containing salt or complex as catalyst under weakly acid conditions, say, above pH 4.5.

A preferred procedure is to acidify the basic reaction mixture from step (1) with an acid in step (2), filter off any precipitated alkali metal salt by-product, wash the reaction mixture with solvent mixture, evaporate excess liquid, and then distill the filtrate to obtain the distillate cut containing the desired 2-alkyl-2,3-dihydro-6-carbo (ester)-4-pyrone products, which may then be dissolved or diluted in an acid or basic medium suitable for the oxidation conditions which are selected for step (3) of this process.

The oxalic acid diesters used in step (1) of the process of this invention are unique in that other acid esters such as formic acid esters, e.g. ethyl formate give non-cyclic products which are not directly useful in the process of this invention since their cyclization to 2-alkyl-2,3-dihydro-4-pyrones is accompanied by yield decreasing side reactions.

With reference to step (3) of the process outlined hereinabove the 2-alkyl-2,3-dihydro-6-carbo(ester)-4-pyrone compounds may be isolated from the reaction mixture of step (2), if desired, as indicated above before being oxidized according to step (3). It may be preferred, however, to conduct step (3) of this process in the same acid neutralized reaction medium in which the 2-alkyl-2,3-dihydro-6-carbo(ester)-4-pyrone intermediates are prepared. In this step (3) the 2-alkyl-2,3-dihydro-6-carbo(ester)-4-pyrone compounds may be oxidized by any of several available methods to introduce the double bond in the 2,3-position, and a hydroxyl group on the carbon atom in the 3-position of the gamma-pyrone ring. For example, these dihydropyrones may be oxidized with air, catalyzed by cobalt acetate-bromide in mildly acidic medium. These 2-alkyl-1,2,3-dihydro-6-carbo (ester)-4-pyrones may also be oxidized by treating them with at least about 2 equivalents of nitrous acid. For example by treating 2-methyl-2,3-dihydro-6-carboethoxy-4-pyrone with excess nitrous acid in ethanol, 6-carboethoxymaltol is obtained. The time of oxidation will depend upon the temperature at which the reaction is conducted, and the oxidizing agent used. With selenium dioxide, the reaction may be conducted for from 1 to 24 hours. For example, in oxidizing 2-methyl-2,3-dihydro-6-carboethoxy-4-pyrone with an equivalent amount of selenium dioxide in ethanol at reflux temperature the reaction to produce 2-methyl-3-hydroxy-6-carboethoxy-4-pyrone [6-carboethoxymaltol] is essentially complete in 8 to 10 hours. The 2-alkyl-3-hydroxy-6-carbo(ester)-4-pyrone products of step (3) may be recovered and purified by conventional methods.

With respect to step (4) which can be termed the "pyrolysis" step, the 2-alkyl-3-hydroxy-6-carbo(ester)-4-pyrone is heated to from about 300° C. to about 600° C. to decompose and remove the 6 carboester group, leaving maltol or a related alkyl homolog. No solvent or diluent need be used. It is preferred to conduct the heating step by vaporizing or distilling the 2-alkyl-3-hydroxy-6-carboester-4-pyrone in an inert gas such as nitrogen, argon, helium, or other gas which does not react with the pyrones, and in such gaseous medium heat the pyrone to a temperature high enough to decompose and remove all of the 6-carbo(ester) group and to form the 2-alkyl-3-hydroxy-4-pyrone. Thus in preparing maltol by this step, a 2-methyl-3-hydroxy-6-carboalkoxy-4-pyrone having at least 2 carbon atoms in the alkoxy moiety preferably 2-methyl-3-hydroxy-6-carboethoxy-4-pyrone is distilled or vaporized into a stream of nitrogen, and in this gaseous medium is carried through a hot tube, heated, e.g., to about 525°–575° C. to decompose the 6-carboethoxy group and to form maltol which can be condensed and recovered. A quartz tube is a useful example of a tube for use in this step.

This pyrolysis step (4) is believed to be unique to those 2-alkyl-3-hydroxy-6-carbo(ester)-4-pyrones which contain a beta-hydrogen in the ester moiety of the 6-carboester group, such as appears in ethyl and higher alkyl ester groups. We find that 2-methyl-3-hydroxy-6-carbomethoxy-4-pyrone is less amenable to this pyrolysis step since higher temperatures are required with that compound. That compound usually requires that it be hydrolyzed to the free acid, 6-methylcomenic acid, and heated in the presence of a solvent such as dimethyl phthalate or other solvents found, for example, in column 11 and 12 of U.S. Patent 3,130,204 to obtain maltol.

The end products of this process of this invention including maltol and alkyl homologs of maltol such as ethylmaltol [1-ethyl-3-hydroxy-4-pyrone], propylmaltol and butylmaltol are useful as flavor and fragrance enhancers in food products and colognes and perfumes. The new intermediate compounds of this invention are useful for preparing flavor and fragrance enhancer chemicals either directly in the process of this invention or by more circuitous routes. For example, maltol can be prepared from 2-methyl-2,3-dihydro-6-carbophenoxy-4-pyrone by oxidation of this compound to the 6-carbophenoxymaltol followed by direct pyrolysis as above, or by hydrolysis of the carbophenoxy ester group to the 6-carboxymaltol compound followed by pyrolysis. Similarly, the new 2-alkyl-2,3-dihydro-6-carboxy-4-pyrone compounds can be used to prepare maltol or related homologs. For example, by treating 2-ethyl-2,3-dihydro-6-carboxy-4-pyrone, with an oxidizing agent such as selenium dioxide, there is obtained 2-ethyl-3-hydroxy-6-carboxy-4-pyrone, which can be decarboxylated in a solvent by known methods to prepare ethylmaltol.

Example 1

This example illustrates the preparation of a 2-alkyl-2,3-dihydro-6-carbo(ester)-4-pyrone in two steps from a 3-alken-2-one and an oxalic acid diester.

A slurry of sodium ethoxide was prepared from 4.6 g. of sodium and 11.6 ml. (9.2 g., 0.2 mole each) of ethanol in 80 ml. of toluene. With stirring and cooling in an ice bath a mixture of 16.8 g. (20.0 ml., 0.2 mole) of 3-penten-2-one and 29.2 g. (27.0 ml. 0.2 mole) of diethyl oxalate was added dropwise (1). There was obtained a clear dark red solution which was neutralyzed by treating it with anhydrous ethanolic hydrogen chloride solution (2). The solution color changed from dark red to yellow. A sodium chloride by-product was filtered off, and the filter cake was washed with toluene-ethanol mixture. The filtrate was evaporated under reduced pressure on a steam bath to reduce the volume, and then distilled. A fraction with a B.P. of 100–120° C./2–3 mm. was collected. This fraction, a yellow liquid, had an index of refraction of $n_D^{25}$ 1.4815 and weighed 27.1 g. This crude product was rectified through a Vigreaux column to give 25.0 g. (68.5% yield) of 2-methyl-2,3-dihydro-6-carboethoxy-4-pyrone, B.P. 103°/0.25 mm., $n_D^{25}$ 1.4832, main infrared bands at 1721, 1666 and 1590 cm.$^{-1}$.

Example 2

This example illustrates the formation of 2-alkyl-3-hydroxy-6-carbo(ester)-4-pyrone compounds by oxidizing the respective 2-alkyl-2,3-dihydro-6-carbo(ester)-4-pyrone (step 3).

An 11.1 g. (0.1 mole) portion of selenium dioxide was slurried in 50 ml. of ethanol and then 18.4 g. (0.1 mole) of 2-methyl - 2,3 - dihydro - 6 - carboethoxy-4-pyrone was added. The mixture was heated with stirring to gentle reflux for eight hours. Selenium which deposited during reflux was filtered off (collected 3.0 g., calculated 7.9 g.). On standing overnight, the filtrate which was obtained turned dark and deposited more selenium. This dark filtrate was then diluted with an alcoholic solution of sulfur dioxide and warmed on a steam bath for 30 minutes, filtered, diluted with water, and extracted with ether. The ether extract containing the product was washed with water, sodium bicarbonate solution, and again with water, and dried over magnesium sulfate. The solution was evaporated to low volume and then the resulting crude product was distilled. After a small enol-negative forerun, two fractions were collected.

(1) B.P. 117–130° C./0.7 mm., $n_D^{25}$ 1.4880, 3.2 g.
(2) B.P. 130–150° C./0.7 mm, $n_D^{25}$ 1.5070, 3.8 g.

Fraction (1) gave a rather weak enol test and consisted mainly (infrared analyses) of unreacted starting material. Fraction (2) slowly deposited a white crystalline material which was filtered off. The melting point of the white crystalline precipitate was 99–109° C. and contained oily impurities. It was purified by recrystallization from ethanol-water mixtures to give white needles, M.P. 121° C. Infrared and nuclear magnetic resonance data and the extremely strong ferric chloride test (same color that maltol gives) indicated the desired structure to be 2-methyl-3-hydroxy-6-carboethoxy-4-pyrone [6-carboethoxymaltol].

$C_9H_{10}O_5$, M.W. 198.17—Cal'cd.: C, 54.54; H, 5.09. Found: C, 54.2; H, 5.24.

Example 3

This example illustrates the pyrolysis or heating step (4) to make maltol or 2-alkyl higher homologs of maltol from the 2-alkyl-3-hydroxy-6-carbo(ester)-4-pyrone intermediate products.

A 3.0 g. portion of 6-carboethoxy maltol [2-methyl-3-hydroxy-6-carboethoxy-4-pyrone] was distilled at 20 mm. Hg pressure into a slow stream of nitrogen, which stream was directed through an empty quartz tube heated to 550° C. The effluent stream coming out of the quartz tube was cooled, and it deposited 1.4 g. of crude maltol. Sublimation of the crude maltol two times using a 120° C. (bath)/ 20 mm. gave 1.20 g. of purified maltol. The yield of crude maltol was 85.5% (corrected for unreacted starting material).

Example 4

This example illustrates an ester acid hydrolysis method of preparing new 2-alkyl-2,3-dihydro-6-carboxy-4-pyrones which can be used to prepare maltol and maltol homologs.

A rapidly stirred mixture of 184.2 g. (1 mole) of 2-methyl-2,3-dihydro-6-carboethoxy-4-pyrone, prepared as described in Example 1 and 40 ml. of conc. hydrochloric acid and 160 ml. of water was heated to reflux. An ethanol-water azeotrope, B.P. 89°–92° C., was distilled off through a short column. The reaction mixture turned yellow, got homogenous and darkened to a dark tan. After 80 ml. of distillate were collected, all volatile material was removed under reduced pressure on the steam bath and 151.6 g. (97.5% yield) of crude 2-methyl-2,3-dihydro-6-carboxy-4-pyrone acids, forming a brown crystalline mass, were obtained. The crude acid mixture was triturated with a boiling mixture of 100 ml. of chloroform and 50 ml. of acetone. After cooling, the solid material was filtered off, washed with carbon tetrachloride and dried to give 75.6 g. (48.5%) of pure higher melting 2-methyl-2,3-dihydro-6-carboxy-4-pyrone isomer, M.P. 150–151° C. The infrared analysis on the solid acid showed bands at 1740, 1690, and 1590 cm.$^{-1}$. The mother liquor was concentrated on a steam bath and, on standing overnight, the low melting isomer of the same acid, 2-methyl-2,3-dihydro-6-carboxy-4-pyrone crystallized in two crops for a total of 37.5 g. The purified low melting isomer had a melting point of 130–132° C. and infrared analyses of the solid acid showed readings at 1730, 1620, and 1587 cm.$^{-1}$.

What is claimed is:
1. A process for preparing 2-alkyl-3-hydroxy-4-pyrones which comprises:
   (1) reacting a 3-alken-2-one having from 5 to 8 carbon atoms with an oxalic acid diester in which each ester group is selected from the group consisting of alkyl radicals having from 1 to 4 carbon atoms, phenyl, and tolyl in a basic pH medium at a temperature below about 50° C. to form a 3-alken-2-one/oxalic acid ester enolate adduct;
   (2) treating the enolate adduct of step (1) with a nonoxidizing acid having an ionization constant at least as high as $10^{-4}$ to form a 2-alkyl-2,3-dihydro-6-carbo(ester)-4-pyrone in which the ester group is selected from the group consisting of alkyl radicals having from 1 to 4 carbon atoms, phenyl, and tolyl;
   (3) oxidizing the 2-alkyl-2,3-dihydro-6-carbo(ester)-4-pyrone from step 2 to form a 2-alkyl-3-hydroxy-6-carbo(ester)-4-pyrone, and
   (4) pyrolyzing the 2-alkyl-3-hydroxy-6-carbo(ester)-4-pyrone at a temperature of from about 300° C. to about 600° C. to obtain a 2-alkyl-3-hydroxy-4-pyrone as product.

2. A process for preparing maltol by a process described in claim 1 which comprises:
   (1) reacting 3-penten-2-one with diethyl oxalate in a basic medium at a temperature of from about −10° C. to about 50° C. to form a 3-penten-2-one/diethyl oxalate enolate adduct;
   (2) treating the enolate adduct from step 1 with a nonoxidizing mineral acid to form 2-methyl-2,3-dihydro-6-carboethoxy-4-pyrone,
   (3) oxidizing the 2-methyl-2,3-dihydro-6-carboethoxy-4-pyrone to form 2-methyl-3-hydroxy-6-carboethoxy-4-pyrone, and
   (4) pyrolyzing 2-methyl-3-hydroxy-6-carboethoxy-4-pyrone by heating it in an inert gas to from about 450° C. to about 550° C. to form maltol.

References Cited

UNITED STATES PATENTS

| | | | |
|---|---|---|---|
| 2,070,603 | 2/1937 | Kilgore | 260—345.8 |
| 2,290,474 | 7/1942 | Kilgore | 260—345.8 |
| 2,138,540 | 11/1938 | Ford | 260—345.8 |

OTHER REFERENCES

Houben-Weyl: vol. VI/4 (1966), pp. 72–74, 87–88.

NORMA S. MILESTONE, Primary Examiner

U.S. Cl. X.R.

260—345.7, 345.8